(12) United States Patent
Ekladyous et al.

(10) Patent No.: US 9,354,139 B2
(45) Date of Patent: May 31, 2016

(54) HEADLAMP AIMER BOX

(71) Applicant: FORD GLOBAL TECHNOLOGIES, LLC, Dearborn, MI (US)

(72) Inventors: Albert Ekladyous, Shelby Township, MI (US); Diane Marie Lahaie, Ann Arbor, MI (US); Arun Kumar, Farmington Hills, MI (US); Mahendra Somasara Dassanayake, Bloomfield, MI (US); John Wesley Wilds, Trenton, MI (US); Stephanie Askew, Livonia, MI (US); Michael Wegrzyn, Bahia (BR); Sleiman N. Abdelnour, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 14/183,593

(22) Filed: Feb. 19, 2014

(65) Prior Publication Data

US 2015/0233784 A1    Aug. 20, 2015

(51) Int. Cl.
*H04N 9/47* (2006.01)
*G01M 11/06* (2006.01)

(52) U.S. Cl.
CPC .................................. *G01M 11/064* (2013.01)

(58) Field of Classification Search
IPC ...................................................... G01M 11/068
See application file for complete search history.

(56) References Cited

U.S. PATENT DOCUMENTS

| | | | | |
|---|---|---|---|---|
| 3,770,969 A | * | 11/1973 | Ansevin | G01N 21/9045 209/526 |
| 4,608,622 A | * | 8/1986 | Gonser | A61C 19/003 250/493.1 |
| 5,373,357 A | * | 12/1994 | Hopkins | G01M 11/064 356/121 |
| 5,504,574 A | | 4/1996 | Murata | |
| 5,751,832 A | | 5/1998 | Panter et al. | |
| 8,125,628 B1 | | 2/2012 | Lones | |
| 8,422,004 B1 | | 4/2013 | Ekladyous et al. | |
| 2012/0224171 A1 | * | 9/2012 | Yotz | G01M 11/061 356/121 |

* cited by examiner

*Primary Examiner* — Tracy Li
(74) *Attorney, Agent, or Firm* — Damian Porcari; Brooks Kushman P.C.

(57) ABSTRACT

A headlamp aimer box includes a housing defining an opening and a tunnel, a window disposed within the opening, and a whiteboard disposed at one end of the tunnel. The box further includes a mirror disposed within the tunnel. The mirror redirects a beam passing through the window from a headlamp toward the whiteboard. A length of the tunnel is such that light patterns directed by facets of the headlamp sufficiently cross a median line associated with the headlamp to form a developed beam on the whiteboard.

15 Claims, 2 Drawing Sheets

HEADLAMP AIMER BOX

TECHNICAL FIELD

This disclosure relates to vehicle headlamp aiming devices.

BACKGROUND

Exterior lighting systems are used in vehicles to assist the driver or occupant in seeing obstructions or avoiding dangerous driving conditions. Vehicles typically use headlamps, situated at the front of the vehicle, as a means to illuminate a roadway during dark or adverse weather conditions. In order to maximize sight distance, vehicle headlamps should be aimed properly.

SUMMARY

A headlamp aimer box includes a housing defining an opening and a tunnel, a window disposed within the opening, a whiteboard disposed at one end of the tunnel, and a mirror disposed within the tunnel and configured to redirect a beam passing through the window from a headlamp toward the whiteboard. The length of the tunnel is such that light patterns directed by facets of the headlamp sufficiently cross a median line associated with the headlamp to form a developed beam on the whiteboard. The aimer box further includes a camera configured to capture an image of the beam on the whiteboard.

A headlamp aimer box includes a housing defining an opening and a tunnel, a whiteboard disposed at one end of the tunnel, and a mirror disposed within the tunnel and configured to redirect light passing through the opening toward the whiteboard. A length of the tunnel is such that patterns of the light directed by headlamp facets sufficiently cross a headlamp median line to form a developed beam on the whiteboard.

A vehicle headlamp aiming system includes an aimer box having a housing defining an opening and a tunnel. The housing includes a whiteboard disposed at one end of the tunnel and a mirror disposed within the tunnel and configured to redirect light passing through the opening toward the whiteboard. A length of the tunnel is such that patterns of the light directed by facets of a headlamp sufficiently cross a median line associated with the headlamp to form a developed beam on the whiteboard. The tunnel is oriented such that the length is generally othrogonal to the light passing through the opening. The system further includes a gantry configured to adjust the aimer box relative to the vehicle headlamp.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Maintaining visibility while operating a vehicle is important. Vehicle headlamps are the primary mechanism for maintaining visibility during dark or adverse weather conditions. Properly aimed headlamps maximize visibility during adverse weather conditions. Headlamps aimed too high, however, can reduce visibility immediately in front of the vehicle. And, headlamps aimed too low can reduce visibility further down the road. Headlamp aiming error is caused by errors introduced during the aiming process at the vehicle manufacturing plant, as well as errors due to the equipment used to aim the vehicle headlamps. Therefore, it may be advantageous to have instrumentation that accurately aims vehicle headlamps without being burdensome on the aiming process used during the production of the vehicle.

Figure 1:
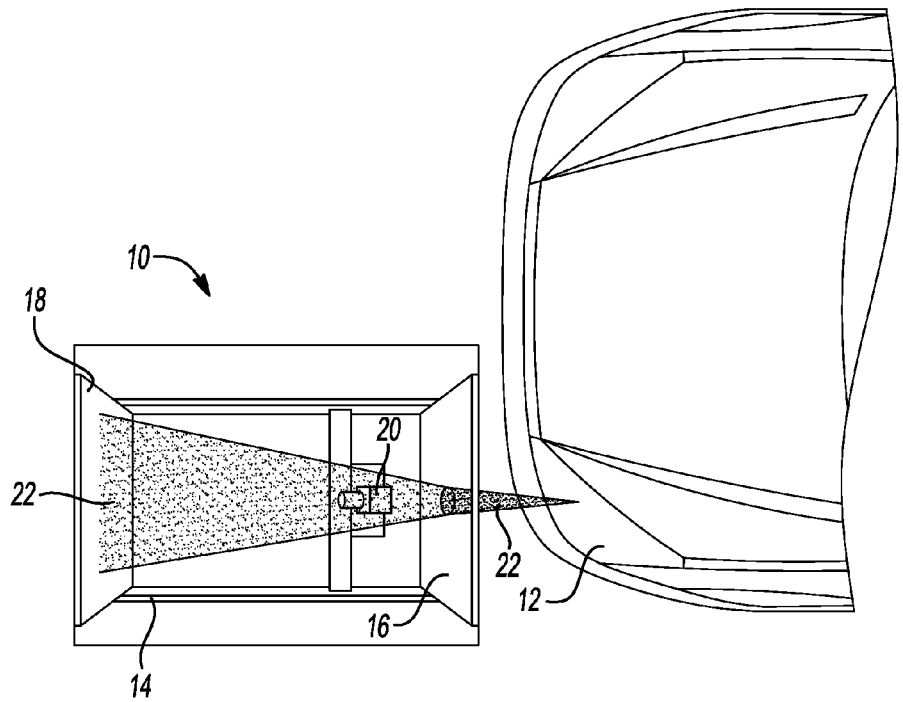
FIG. 1 is a top view of a prior art vehicle headlamp aimer box.

Referring to FIG. 1, a prior art headlamp aimer box 10 for a vehicle headlamp 12 is provided. The aimer box 10 includes a Fresnel optical lens 16, a whiteboard 18, and a camera 20. Light from the vehicle headlamp 12 is shined into the housing 14, through the Fresnel optical lens 16, and onto the whiteboard 18. The Fresnel optical lens 16 is used to artificially create distance. Using a Fresnel optical lens 16 may subject the aiming process to error. Time and exposure to vehicle headlamps 12 degrades the Fresnel lens 16 and diffuses the vehicle headlamp beam pattern 22. Further, ambient conditions such as temperature and dust may induce error when aiming the vehicle headlamps 12. These errors may distort the headlamp beam pattern 22 creating additional aiming adjustments.

Tighter tolerancing and quality expectations may make the Fresnel lens error significant. The errors associated with the Fresnel lens 16 may create aiming problems. Small angular error introduced by the Fresnel optical lens 16 during production aiming results in a large angular error during production audit. For example, a small particle of dust on the Fresnel lens 16 may cause a larger blind spot in a headlamp beam pattern 22 when the beam pattern 22 is projected at a longer distance. This may result in the vehicle headlamp beam 22 either projecting too high or too low—reducing visibility of the road. The Fresnel optical lens 16 is also expensive and therefore adds cost to the vehicle headlamp aiming processes. Therefore, a solution that allows a vehicle headlamp 12 to be aimed without using a Fresnel optical lens 16 may be preferred.

One solution to reducing the error created by using the Fresnel optical lens 16 is to extend the range of the aimer box 10 while maintaining a consistent manufacturing cycle time. By maintaining traditional headlight aiming procedures without using a Fresnel optical lens 16, the production cycle time for the vehicle headlamps 12 will not change. Using traditional procedures and reducing production quality audit time by reducing the errors created by the Fresnel lens 16 will save time, cost, and manufacturing expenses. For example, one way of extending the range of the vehicle headlamp aimer box 10 in order to remove the Fresnel optical lens 16 is to extend the length of the aimer box 10 in the vertical direction.

Figure 2:
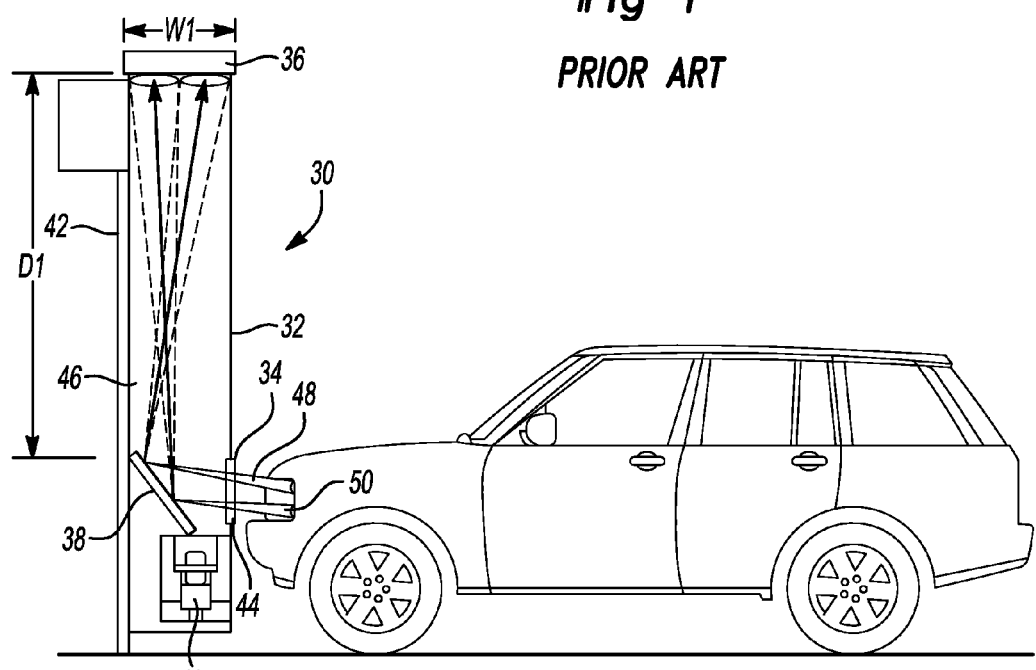
FIG. 2 is a side view of a vehicle headlamp beam projecting into a vehicle headlamp aimer box.

Referring to FIG. 2, a headlamp aimer box 30 is provided. The headlamp aimer box 30 includes a housing 32, a window 34, a whiteboard 36, a mirror 38, and a camera 40. The housing 32 is fixed to a movable gantry 42, and defines an opening 44 and a tunnel 46. Disposed on the housing 32 and covering the opening 44, the window 34, being non-reflective and transparent, allows beam patterns 48 from a vehicle headlamp 50 to pass into the tunnel 46. The window 34 also assists in preventing dust and other particulates from entering the housing 32. Preventing particulates from entering the housing 32 helps to reduce distortion of a headlamp pattern 48 during aiming processes.

The tunnel 46 extends vertically and has a whiteboard 36 disposed at one end of the tunnel 46. The tunnel 46 has a width to accommodate one or more beam patterns 48 projecting from the headlamp 50, as will be discussed in more detail below. A mirror 38 is disposed within the tunnel 46. The mirror 38 is configured to redirect the headlamp beam 48 passing through the window 34 toward the whiteboard 36. The angle of the mirror 38 governs the dimensions of the tunnel 46. The mirror 38 should be placed at an appropriate angle and distance from a vehicle headlamp 50. In one embodiment, the mirror 38 is placed at a 45° angle resulting in a width W1 of the tunnel 46 and housing 32 of approximately two feet. Using this example, a tunnel length D1 between the whiteboard 36 and the mirror 38 may be at least 10 feet. This example, however, merely illustrates a minimum distance. The tunnel length may be longer than 10 feet, and the longer the tunnel length the more developed the beam pattern 48 may be. As discussed below, the more developed the beam pattern 48, the more accurately aligned the headlamp 50.

Figure 3:
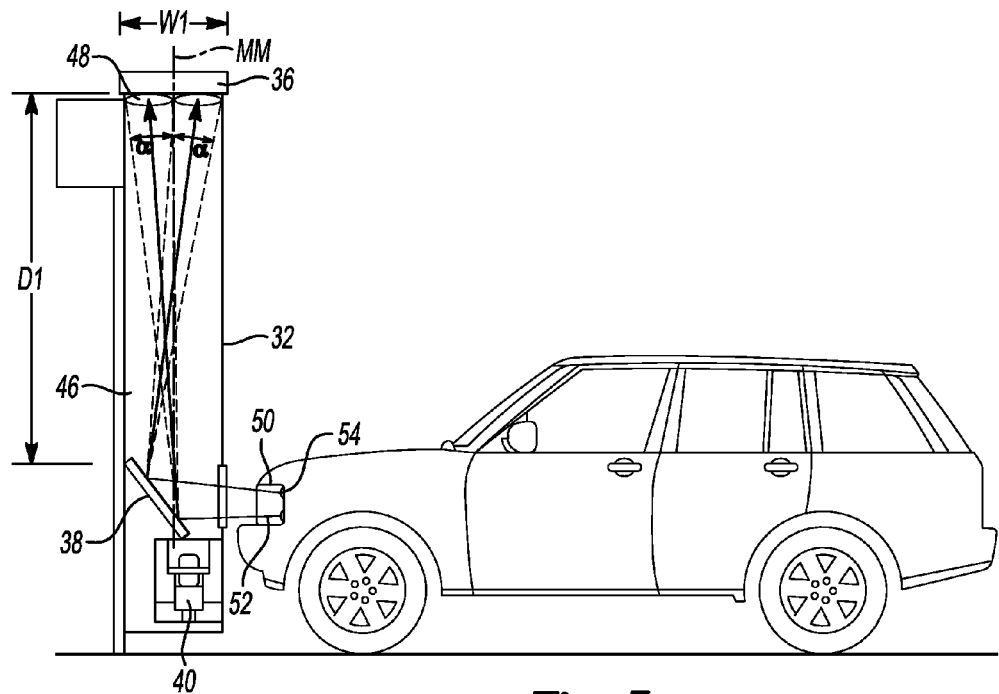
FIG. 3 is a cross-sectional view of a vehicle headlamp aimer box with the vehicle headlamp beams developing within the box.

In order to accurately align a vehicle headlamp 50, the headlamp beam 48 must sufficiently develop on the whiteboard 36. Light from a vehicle headlamp 50 is directed by a facet 54 disposed within the headlamp 50. As seen in FIG. 3, there may be multiple facets 54 in a vehicle headlamp 50. Each facet 54 directs a light pattern 52 which contributes to the headlamp beam 48. Developing a headlamp beam 48 requires that the light patterns 52 cross over a median line MM. After being redirected by the mirror 38, the light patterns 52 directed by the facets 54 of the headlamp 50 merge and cross over the median line MM. In order to meet certain quality standards, the whiteboard may be disposed at a minimum distance that allows the light patterns to cross the median line MM. However the further away the whiteboard is disposed from the mirror, the more developed the beam 48. As the distance between the whiteboard and the mirror increases, the larger the light patterns 52 and beam 48 become. This aids in accurately aiming the headlamp beam 48.

Further, the housing 32 may have a width W1 such that portions of the headlamp beam 48 at least 5° from both sides of the median line MM are captured on the whiteboard 36. As depicted in FIG. 3, this 5° tolerance is denoted by symbol α. In FIG. 3, each α equals 5°. Allowing for 5° from each side the median line MM to be captured on the whiteboard 36 accounts for an error tolerance that is 3° from the right and 3½° from the left. This allows the housing 32 to account for 2° of manufacturing tolerances from the right and 1½° of manufacturing tolerances from the left. Other widths, however, are also possible. For example, as the length of the tunnel D1 increases, the beam 48 becomes larger. Therefore, a longer tunnel length D1 may require an increase in the tunnel width W1.

Once the headlamp beam 48 is developed on the whiteboard 36, a camera 40 captures an image of the beam 48. The camera 40 is disposed at one end of the tunnel 46 opposite the whiteboard 36. The camera 40 faces the whiteboard 36 in order to accurately capture an image of the beam 48. The camera 40 may be any light imaging device but is preferably a CCD camera. After the beam 48 image is captured by the camera 40, a control system analyzes and adjusts the headlamps 50. Those details are disclosed in United States Patent U.S. Pat. No. 8,422,004 B1, the disclosure of which is hereby incorporated by reference.

Figure 4:
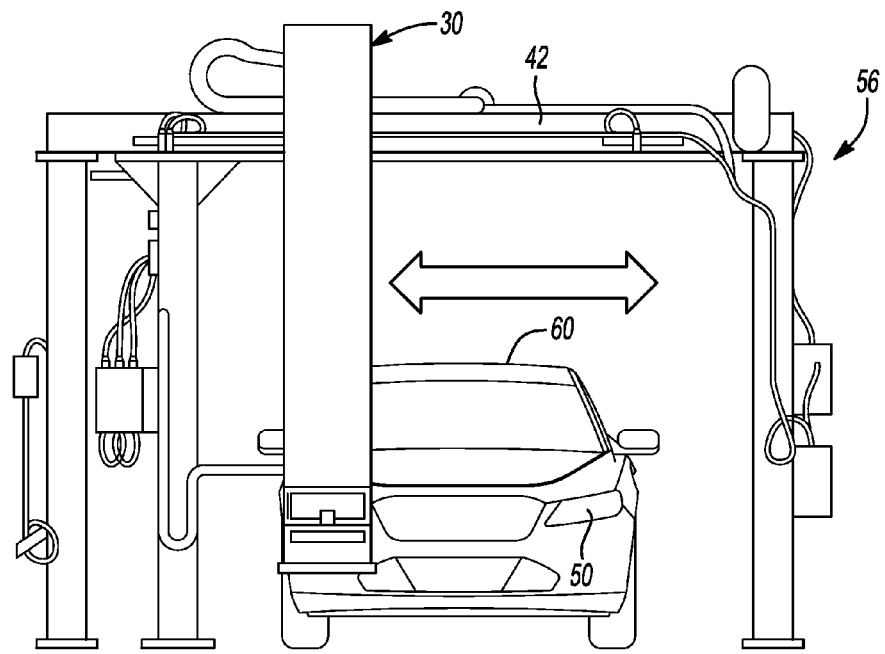
FIG. 4 is a front view of a vehicle headlamp aiming system.

Referring to FIG. 4, a vehicle headlamp aiming system 56 is provided. The vehicle headlamp aiming system 56 includes the aimer box 30 and a gantry 42. The aimer box 30, as described above, is attached to the gantry 42 and extends generally orthogonal to the vehicle headlamp 50. In at least one embodiment, the gantry 42 is able to support at least one aimer box 30. The gantry 42 may also be configured to support a plurality of aimer boxes 30 and the preferred embodiment should be considered merely exemplary. In this preferred embodiment, the gantry 42 is configured to allow the aimer box 30 to slide horizontally and move between vehicle headlamps 50. The gantry 42 may be constructed with at least two support members and a guide rail extending between the support members. Additionally, the gantry may have a guide member attached to the guide rail. The guide member may be configured to support the aimer box 30 and slide horizontally along the guide rail. Being able to move between vehicle headlamps 50 accurately and efficiently may help to maintain a consistent manufacturing cycle time and reduce the errors during production quality audit. This may also reduce the added expense of needing an additional aimer box, saving manufacturing expenses.

The gantry 42 may also be configured to move the aimer box 30 vertically. This allows for the headlamp aiming system 56 to support vehicles 60 having different headlamp heights. Also, vehicle headlamps 50 may contain different light sources, such as a standard light bulb or an LED light. Light emanating from different sources may be directed by the facets at slightly different angles. This requires the gantry 42 to adjust the aimer box 30 in very small vertical dimensions. Therefore, the gantry 42 may be configured to move the aimer box 30 vertically between small vertical adjustments as well as larger vertical adjustments. Adjusting the aimer box 30 in the vertical direction, as well as in the horizontal direction, allows the headlamp aiming system 56 to support differing styles of vehicle 60. For example, a sedan may have a lower headlamp 50 height and a narrower width than a SUV, or a truck. Being able to make adjustments in both the horizontal and vertical directions on the gantry 42 allows the headlamp aiming system 56 to easily move between various styles of vehicle 60.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A headlamp aimer box comprising:
    a housing defining an opening and a tunnel;
    a window disposed within the opening;
    a whiteboard disposed at one end of the tunnel;
    a mirror disposed within the tunnel and configured to redirect a beam passing through the window from a headlamp toward the whiteboard, wherein a length of the tunnel is such that light patterns directed by facets of the headlamp sufficiently cross a median line associated with the headlamp to form a developed beam on the whiteboard; and
    a camera configured to capture an image of the beam on the whiteboard.

2. The box of claim 1 wherein the tunnel has a width such that portions of the beam at least five degrees from the median line of the beam are captured on the whiteboard.

3. The box of claim 1 wherein a distance between the whiteboard and mirror is at least ten feet.

4. The box of claim 1 wherein a distance between the window and mirror is less than two feet.

5. A headlamp aimer box comprising:
    a housing defining an opening and a tunnel;
    a whiteboard disposed at one end of the tunnel; and
    a mirror disposed within the tunnel and configured to redirect light passing through the opening toward the whiteboard, a length of the tunnel being such that patterns of the light directed by headlamp facets sufficiently cross a headlamp median line to form a developed beam on the whiteboard.

6. The box of claim 5 further comprising a camera disposed within the housing and configured to capture an image of the beam on the whiteboard.

7. The box of claim 5 further comprising a window disposed within the opening and configured to allow light to pass through the opening and window.

8. The box of claim 5 wherein the tunnel has a width such that portions of the beam at least five degrees from the median line of the beam are captured on the whiteboard.

9. The box of claim 5 wherein a distance between the whiteboard and mirror is at least ten feet.

10. The box of claim 7 wherein a distance between the window and mirror is less than two feet.

11. A vehicle headlamp aiming system comprising:
    an aimer box having a housing defining an opening and a tunnel, the housing including a whiteboard disposed at one end of the tunnel and a mirror disposed within the tunnel and configured to redirect light passing through the opening toward the whiteboard, a length of the tunnel being such that patterns of the light directed by facets of a headlamp sufficiently cross a median line associated with the headlamp to form a developed beam on the whiteboard, and the tunnel being oriented such that the length is generally orthogonal to the light passing through the opening; and
    a gantry configured to adjust a position of the aimer box relative to the vehicle headlamp.

12. The system of claim 11 wherein the gantry is further configured to support a plurality of aimer boxes.

13. The system of claim 11 wherein the tunnel vertically extends away from ground.

14. The system of claim 11 wherein the tunnel has a width such that portions of the beam at least five degrees from the median line of the beam are captured on the whiteboard.

15. The system of claim 11 wherein a distance between the whiteboard and a center of the mirror is at least ten feet.

* * * * *